United States Patent [19]

McClure et al.

[11] 4,350,941
[45] Sep. 21, 1982

[54] CONTROL FOR AUTOMATIC MACHINE TOOL DRIVE

[75] Inventors: George W. McClure, Saline; Veljko Milenkovic, Birmingham, both of Mich.

[73] Assignee: Ford Motor Company, Dearborn, Mich.

[21] Appl. No.: 188,449

[22] Filed: Sep. 19, 1980

[51] Int. Cl.³ .............................................. G05B 19/28
[52] U.S. Cl. ..................................... 318/603; 364/474
[58] Field of Search ....................... 318/602, 603, 600; 364/474

[56] References Cited

U.S. PATENT DOCUMENTS

| | | | |
|---|---|---|---|
| 3,370,289 | 2/1968 | Hedgcock et al. | 318/602 X |
| 3,752,969 | 8/1973 | Kiffmeyer et al. | 318/602 X |
| 3,826,964 | 7/1974 | Byrne | 318/602 |
| 4,131,838 | 12/1978 | Etoh et al. | 318/603 |
| 4,305,029 | 12/1981 | Takahashi | 318/602 X |

Primary Examiner—B. Dobeck
Attorney, Agent, or Firm—Frank G. McKenzie; Donald J. Harrington

[57] ABSTRACT

A motion control system includes a single stage gear reducer and power screw, a brushless variable-speed electric motor with position and velocity sensing instrumentation, a solid state power amplifier, and a programmable controller. During operation an absolute positional reference is established when the slide actuates a non-contacting limit switch to signal that the slide is within less than one motor revolution of the correct starting point. A memory accessible by a microprocessor has paired values of velocity and position stored in a table representing ideal such values for deceleration portions of the motion cycle. Alternatively, the microprocessor computes each new value of position and velocity in real time as required to update the velocity commands sent to a comparator. The comparator compares the predetermined slide position to the actual slide position and signals the microprocessor that a change in output to the motor power supply is required. A digital to analog converter converts the motor velocity signal that issues from the microprocessor to a variable d.c. voltage whose magnitude varies over a range that determines the sense of direction and speed of the drive motor.

6 Claims, 4 Drawing Figures

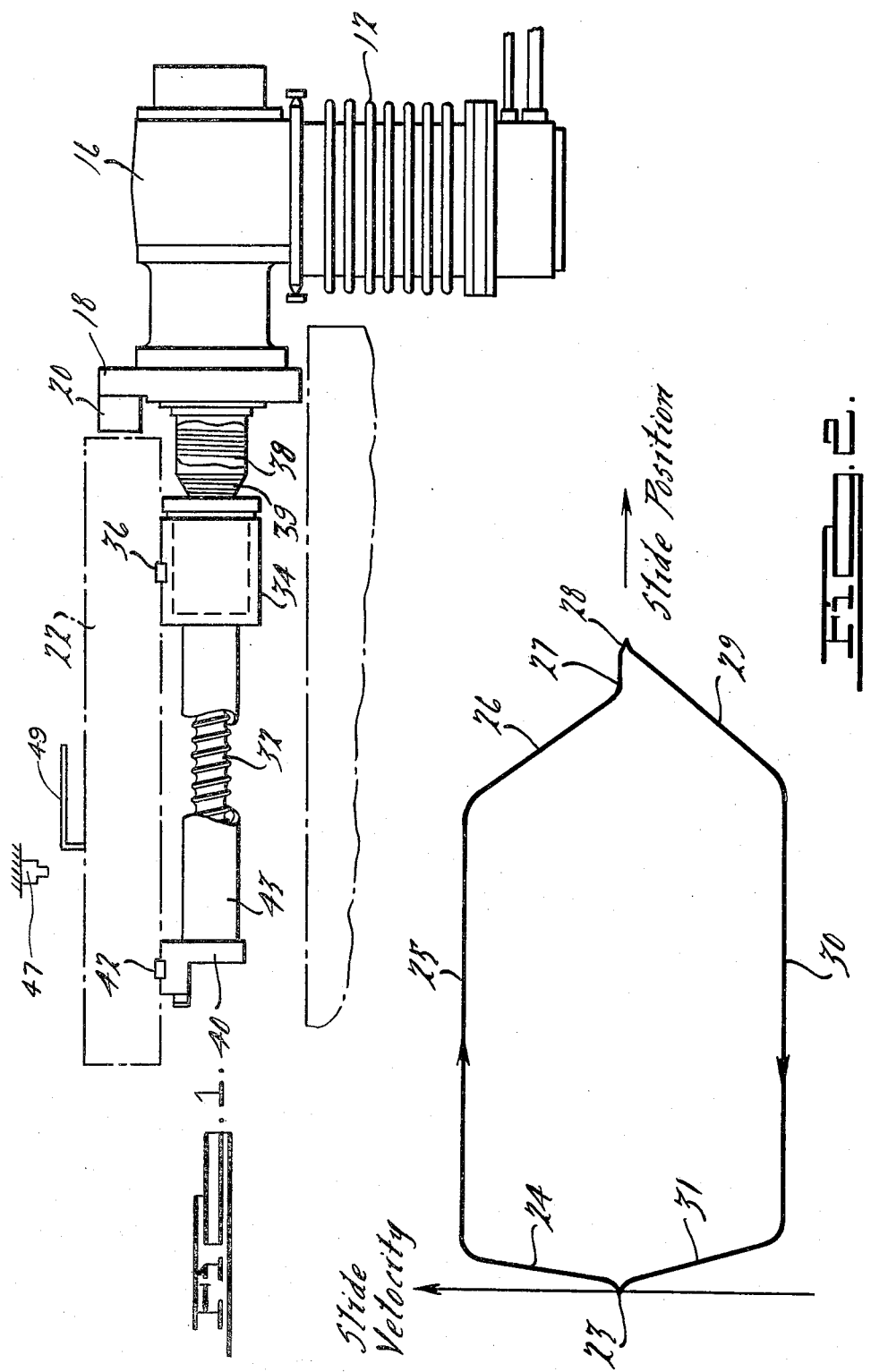

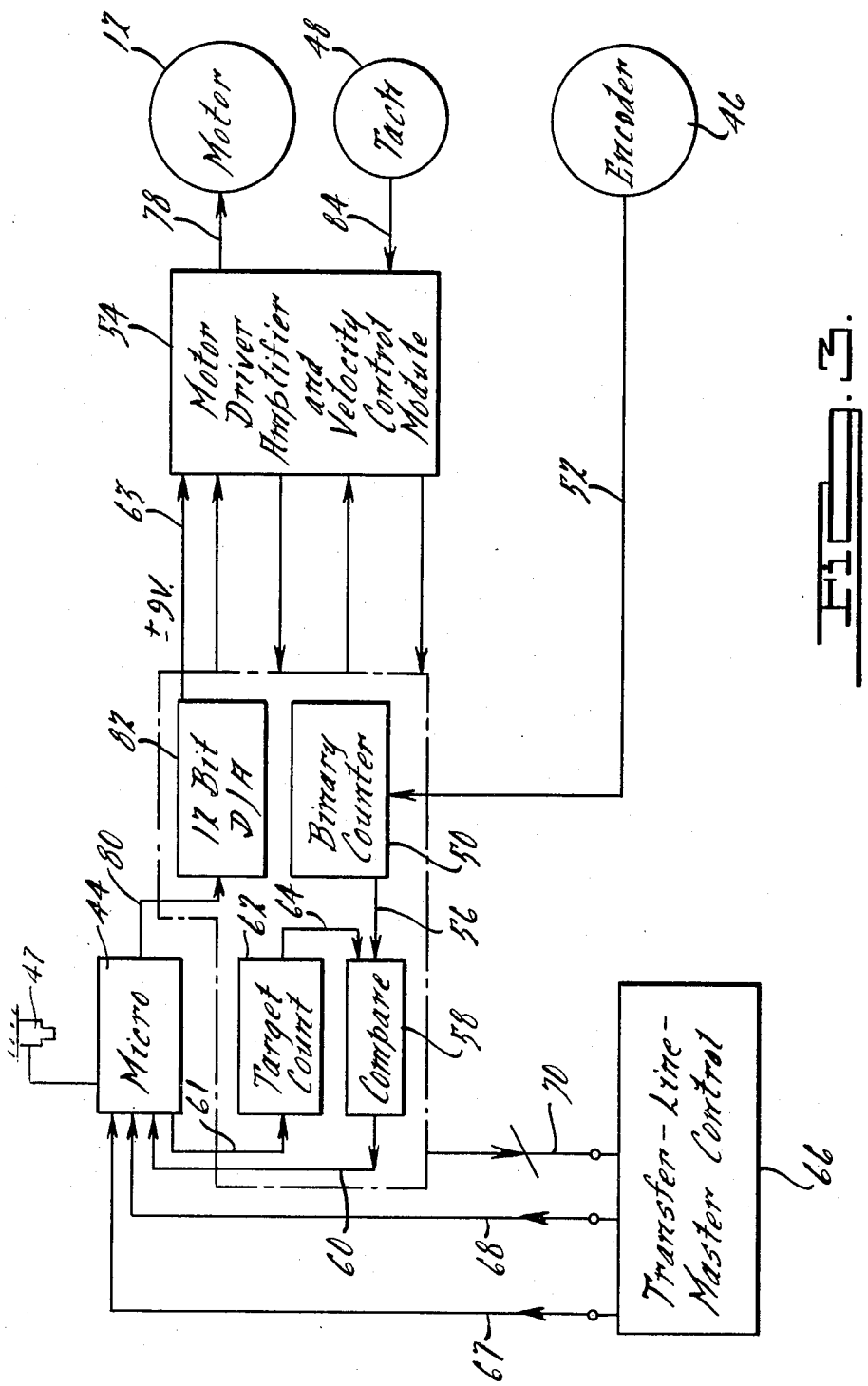

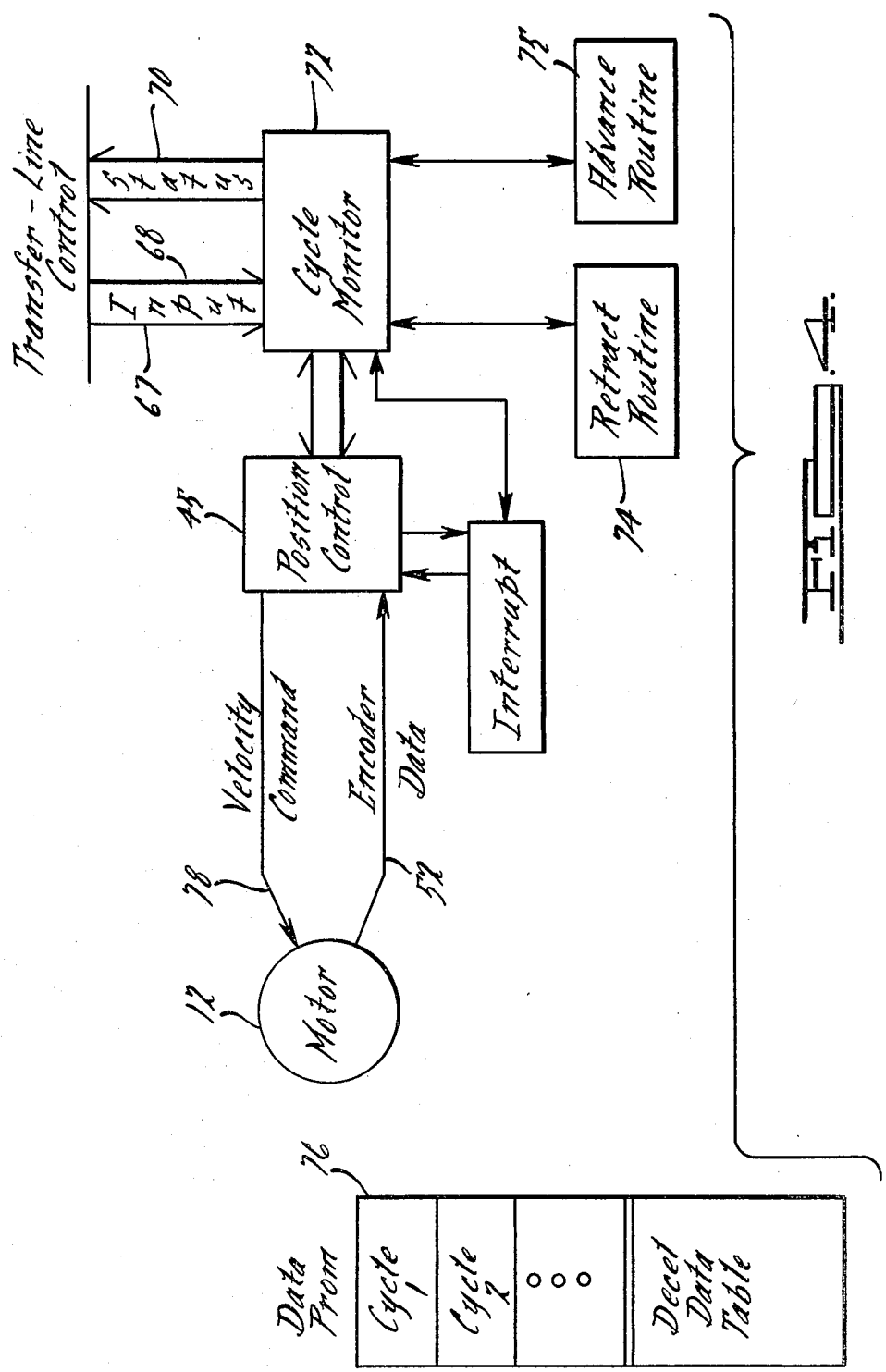

CONTROL FOR AUTOMATIC MACHINE TOOL DRIVE

BACKGROUND OF THE INVENTION

1. Field of the Invention

This invention relates to an electromechanical drive system that includes a transmission, a brushless variable speed electric motor having velocity sensing instrumentation, and an industrial programmable controller. More particularly, this invention pertains to such a system for operating the displaceable carriages of way and transfer units used in automatic machining operations.

2. Description of the Prior Art

Conventional electromechanical slide drive systems employ two motors. One operates at high speed for rapid traverse of the distance between the position of the slidable carriage when the workstation receives the workpiece from the conveyor system to its position before the cutting operation begins. The other motor operates at a much lower speed to feed the cutting tool slowly toward the workpiece during the machining operation. Typically, the two motors operate through an elaborate mechanical transmission employing clutches and brakes to selectively connect the motors through appropriate gear reduction ratios to a lead screw that produces the linear motion of the slide. During the operating cycle, the transitions from rapid forward speed to feed speed, from feed speed to rapid reverse, and from reverse to dwell are controlled by a number of electromechanical limit switches. The clutches, brakes and limits switches and the many gears, belts, bearings used in such systems are susceptible of premature failure and high rates of wear.

Furthermore, the uncertain nature of brake performance requires that the slide position defining conclusion of the high speed traverse and commencement of the low speed feed be located substantially ahead of the point where the cutting tool engages the workpiece. The location of the transition from high speed to feed speed has been found to vary in drive systems according to current practice as much as three-eights of an inch from the intended point of transition. As a consequence of this wide tolerance range and the need to slow the slide unit well away from the workpiece, a considerable amount of lost time is spent in transporting the cutting tool at the slow feed rate into engagement with the workpiece.

Conventional d.c. motors can produce variable speed, high torque and precise control, but the brushes of such motors require frequent maintenance, particularly in the environment of a manufacturing plant. For this reason it is preferable that a brushless motor be used to power the drive system. In addition to providing reliable maintenance-free operation, the preferred motor must produce sufficient torque to move heavy objects at high speed and to feed them against the force of the cutting tool. Furthermore, the motor must develop a high rate of acceleration in order that the cutting tool can be moved quickly toward the workpiece and returned to its rest position. Of course, it is essential that the motor conforming to these specifications consumes as little power as possible.

With conventional slide drives the way units must be decelerated from fast speed to feed speed approximately one-quarter to three-eights of an inch from the work surface to prevent the cutting tool from impacting the workpiece due to slower than normal braking action. The result of premature slowdown is known as "air cutting", i.e., the process during which the tool is advanced slowly enough to cut metal but in reality is merely rotating in air. It is preferable that a slide drive system initiate the feed speed position of the motion cycle closer to the cutting tool, perhaps within 0.002 inches of the work surface.

In conventional slide drives, the feed speed is limited to one of a number of discrete speeds determined by the available gear ratios of the transmission. In order to vary the rate of feed speed, the gear ratios of the transmission must be changed. If the feed rate were infinitely adjustable and could be varied by a simple programming modification made to the control system, variations in the material of the workpiece and quality of the cutting tool could be accommodated to facilitate production. For example, if the hardness varied between batches of workpieces or the sharpness of the cutting tool deteriorated as machining time accrued, conventional slide drives could not automatically change the feed rate. By simple modifications to the programmed feed rate, the control according to this invention can deal with such subtle yet predictable process variations.

The controls for systems heretofore available require complicated mechanical assemblies whose reliability is low and whose repair is difficult, time consuming and costly. Further, these controls are inflexible and not readily adaptable to permit changes in a production line that require alterations in the forming process, variations in the workpiece material or the processing thereof. Highly automated, modern manufacturing production lines require great flexibility in adapting the controls of the forming tools to a wide variety of conditions, processes, and dimensional changes. It is preferable that the controls for operating the mechanical drive be suitable with this requirement for simple and easy changeover. Furthermore, the controls should be adaptive controls to adjust the working cycle to variations in dimensions or machinability between workpieces of the same kind.

SUMMARY OF THE INVENTION

The control system according to our invention is adapted for use with a variable speed electric motor whose rotation produces cyclical forward and reverse movement of a slide. The system includes a proximity switch that produces a signal indicating the location of the slide at a reference position, which when actuated initializes the control system for the next cycle of slide motion. An encoder produces a constant number of electrical pulses during each revolution of the motor shaft and a signal representing the absolute number of rotor shaft revolutions that occur following the initialization signal. The position control produces a signal representing the actual position of the slide relative to the reference position according to the number of encoder pulses that occur after the initialization signal. The position control includes a binary counter that counts the number of pulses received from the encoder after initilization. The binary counter inputs its register value sequentially to a comparator whose other input is a binary number representing the target position of the slide corresponding to a particular slide velocity. The target count and its corresponding velocity are recalled by the microprocessor from a lookup table wherein ordered pairs of slide position and velocity are stored to define the desired relationship between these variables during certain portions of the motor cycle of the slide. When the binary counter register and target count are equal, the comparator issues a signal to the microprocessor, which then transmits an updated signal of the slide velocity command that corresponds to the next target slide position. This signal is received by a binary digital-to-analog converter that produces an analog voltage signal whose polarity represents the sense of direction of the motor rotation and whose magnitude is proportional to the motor speed.

Power from the variable speed electric motor is transmitted through a speed reducer that drives a ball screw turning within a ball nut. The nut is fixed to the slide and moves axially on the ball screw as the shaft is turned. In this way, the position of the slide varies in either direction along the slide path and has a velocity that corresponds directly with the speed of the motor shaft. The mechanical drive system may include a worm gear speed reducer that produces a speed reduction from the motor speed of approximately 6 to 1 , although other speed ratios and speed reducers of other kinds may be used.

The variable speed motor used in connection with this control system is preferably of the d.c. brushless motor type. However, a variable frequency a.c. induction motor, or a variable frequency a.c. synchronous motor having either a soft iron salient pole rotor (reluctance synchronous) or a permanent magnet rotor could be used. In conventional slide drives the choice of feed rate is limited to one of discrete steps determined by the gear ratios available. Alteration of drive hardware is needed to change from one feed rate to another. A substantial gain in productivity is realized with the use of this invention because the feed rate can accommodate infinite adjustments by simply altering program steps or the position-velocity relationship defining slide motion along its path. These parameters are easily modified by changing the lookup tables that are stored in the computer access memory.

Control software can retain in memory many different operating cycles that can be selected by remote control if desired. Machining of different workpieces arriving at the workstation in identical batches or randomly mixed is possible. The control can be adapted to adjust the working cycle to variations in dimensions or machinability variations among workpieces of the same kind.

The control and drive system of this invention represents an advancement in industrial motor technology and provides a powerful and rugged programmable servo-controlled drive unit. The unit is adaptable to applications other than the machine tool slides. It can execute numerically programmable, precisely controlled displacement-time or velocity profile relationship commands with a force of many thousand pounds. The system can be used to replace mechanical drives which employs specially designed cams and offers great adaptability to product changes and the manufacturing installation.

BRIEF DESCRIPTION OF THE DRAWINGS

FIG. 1 is a schematic diagram showing the slide driven by a ball screw and nut through a speed reduction gearbox that is powered by a variable speed electric motor.

FIG. 2 is a graphical representation of the desired or target velocity-position relationship over a full cycle of forward and rearward motion for a slide whose position and velocity so defined can be controlled by the system according to this invention.

FIG. 3 is a schematic block diagram of the motor control system for a mechanical slide assembly showing the position control, the microprocessor and the motor servo-control.

FIG. 4 shows the operating relationship of the computer software with the control signals received by and transmitted from the data processor.

DESCRIPTION OF THE PREFERRED EMBODIMENT

Referring to FIG. 1, a variable speed electric motor 12 has its output shaft splined to the worm pinion shaft of a speed reduction gear box 16. An adaptor plate 18 is mounted on the face of the gearbox casting 16 and has a rubber bumper pad 20 abutting the end face of a slide table 22. The slide 22 is mounted on tracks to facilitate its linear movement forwardly away from the electric motor-gearbox assembly and rearwardly toward the assembly.

The slide may have a machine tool mounted thereon adapted to perform a metal cutting operation on a workpiece that is located at the forward end of the slide path. The drive system can be adapted to way units or to transfer units that carry workpieces from one conveyor system to another or between the conveyor and the work station in an automated manufacturing line. The variable speed motor control system of this invention can be used to power any variable speed drive, but is particularly adapted for use with machine slide units. Generally, the slide operates over a repetitive cycle of forward and rearward motion. The cycle begins from the rest or reference position of FIG. 1 where the slide has its rear face abutting the bumper pad 20 of adaptor plate 18.

The mechanical drive system transmits the power from the electric motor 12 through a ball screw 32 that turns within a ball nut 34 fixed driveably at 36 to the slide. The worm and worm gear that drive the ball screw are on non-intersecting, perpendicular shafts, the worm shaft being colinear with the motor shaft and worm gear shaft being colinear with the ball screw 32. The worm and worm gear are formed with the same hand of helix. An arrangement of bumpers 20 and Belleville washers 38 mounted on the inner end of the ball screw absorbs energy that may be dissipated as a result of the slide returning beyond the reference position or failure of the motor to stop the slide before it reaches a mechanical limit. The ball screw is encapsulated in a cylindrical sleeve 43 whose outer end is supported on a stop block 40, which is keyed at 42 to the slide table 22. A telescoping sleeve assembly 39 has one end fixed to ball nut 34 and the opposite end connected to adaptor plate 8. As the nut moves axially, sleeve assembly 39 extends and retracts accordingly.

The worm gear speed reducer produces a speed reduction of 6 to 1 so that the ball screw turns with the maximum velocity of 600 rpm. As the screw rotates, the ball nut fixed to the slide moves axially on the screw whereby slide 22 is advanced and retracted at a velocity corresponding to the rotational speed of the motor and in a direction corresponding to the direction of rotation of the motor, as determined by the polarity of the voltage applied to the motor windings.

FIG. 2 shows the typical velocity-position relationship for a slide unit along its path for one full cycle of slide motion. The cycle begins with the slide at rest at the reference position 23. A step velocity output signal is transmitted to the motor indicating that full rotor speed is desired. Consequently, the slide accelerates along a ramp 24 to the maximum slide velocity 25, 300 inches per minute, which corresponds to the full rotor speed, 3600 rpm. The maximum speed condition can be obtained in approximately 230 mS. The slide attains the constant rapid forward speed 25 and may continue at this speed for approximately one second whereupon the control system decelerates along a ramp 26 to a feed speed 27. While the slide moves at the feed rate, the cutting tool is performing a machining operation on the workpiece. Typically, the cycle includes a dwell period 28 during which the slide pauses for a short time, perhaps for 0.5 seconds, at the conclusion of the feed cycle. The dwell period is followed by the return portion of the cycle during which the slide accelerates along a ramp 29 to the maximum slide velocity 30, which speed it may maintain for perhaps one second. The slide is decelerated along a ramp 31 to the reference position 23 at which point the system is initialized and the next cycle begun following a pause at the reference position that may last for about 5 seconds. During this dwell period and during the return portion of the cycle, the completed workpiece is removed from the work station and the next workpiece is moved into position for the subsequent machining operation.

The deceleration from rapid speed to feed speed along the ramp 26 must be controlled with particular accuracy so that the position of the slide when the feed speed condition begins is perhaps within 0.010 inches of the face of the workpiece to be machined. In conventional drives of this kind the starting point of the feed speed rate is not accurately reproducible; hence the target position must be set substantially ahead of the point where the cutting tool contacts the workpiece. This is done in order to prevent a high speed collision of the cutting tool with the workpiece that may result from slower than normal braking action. Assuming collision is averted, the feed speed rate, which is approximately one-tenth of the rapid speed rate, extends over a greater distance than required; the increased length accounts for the greater tolerance required to avoid the collision. During a portion of the feed speed portion of the cycle, therefore, the cutting tool, although turning, is not contacting the workpiece. The control system of our invention begins the feed speed motion as close as 0.002 inches from the work surface. Furthermore, if the actual location of the work surface varies within a significantly large tolerance, adaptive control permits the feed speed portion of the motion cycle to be adjusted accordingly.

The position control system is shown in FIG. 3 in combination with an electronic microprocessor 44, an optical incremental encoder 46, a motor 12 and a tachometer 48. The slide position encoder 46 is a non-contacting rotational transducer that generates a pulse train, which after being decoded provides one thousand pulses for each rotor revolution and one index or marker pulse per revolution of the motor shaft. The signals required by the position controller, which are received from encoder 46 through the line 52, are two pulse trains in quadrature having 250 cycles per revolution. When interpreted by the position logic, the required one-thousand pulses are derived from the rising and falling edges of the two quadrature waveforms. The maximum pulse rate therefore is 60,000 pulses per second.

During operation, a reference position for the slide is established at the beginning of each cycle. To accomplish this, the slide actuates a proximity switch 47 comprising a nonmagnetic, inductive circuit that senses the location of metallic vane 49, which is mounted on slide table 22. The circuit is closed when vane 49 moves under the switch 47. The reference position is accurately established by the index or marker pulse of the encoder. The data processor counts the encoder pulses occuring after the reference position is established as the slide advances and returns along its path. The encoder pulses are converted to a signal indicating the relative position of the slide measured from the reference position.

The reference position is defined as the position of the slide at the first occurence of a marker pulse following closure of the proximity switch 47 as the slide is moving backwardly. Therefore, the proximity switch is only required to locate the slide within one motor revolution of the true reference position. The reference position is derived from the marker pulse. Until the reference position is established, which action resets all counters, hardware and software to zero, the slide 22 is not permitted to move forward if proximity switch 47 is open.

The most retracted position is usually not the rest or reference position 23 at which the automatic cycle begins. To minimize production cycle time, the slide should move rearward only as far as necessary for tools to clear the workpiece and to permit workpiece transfer. It is necessary to set the reference position at some point forward of the most retracted position according to the requirement of each work application. This is done by mechanically setting the location at which the proximity switch produces its signal. The slide is moved to its most retracted position only by manual control during set-up or maintenance, usually during a tool change. The fully retracted position is therefore referred to as the "tool-change position". The automatic cycle does not begin there, but at the rest or reference position 23 that is jointly controlled by the proximity switch and by the shaft revolution count signal or marker pulse of encoder 46 that occurs once per revolution.

The variable speed motor 12 is brushless and has the characteristics of a d.c. servo motor. The rotor of the motor incorporates rare earth permanent magnets and the stator has power windings energized by three power leads, which during rotation are sequentially energized two at a time. Transistorized power devices are used for ON-OFF switching or commutation of the leads and for controlling the magnitude of the motor current. The incremental encoder 46 and tachometer 48 may be integrally formed with the motor to facilitate production of pulses synchronized to motor shaft revolution and to sense its speed. The power supplied to the motor 12 is controlled by three phase, pulse width modulated transistor switching amplifier having complete servo control and current limiting circuitry.

The binary counter 50 is connected through line 56 to a digital comparator 58 whose output is carried through line 60 to the microprocessor 44. The microprocessor has access to a non-volatile erasable programmable read only memory (EPROM) that has paired values of slide velocity and slide position defining any portion of the slide cycle shown in FIG. 2 but most particularly of interest would be the deceleration ramp 26. The target slide position recalled from memory is delivered through line 61 to a target position count register 62.

The output from this register is delivered to one input of the comparator 58 through line 64. When the binary numbers from the target register and the binary counter are compared in the comparator 58 its output is carried on a line 60 to the microprocessor. When these values match, an interrupt signal to the microprocessor 44 suspends other activities of the microprocessor while a new target position and an updated velocity command are issued to the motor servo control 54.

The control of motor speed is exercised by the microprocessor by output signals issued to the motor servo control 54 on the line 63. The output signals are first latched and converted to a variable analog voltage whose magnitude varies in the range of 9 volts. The 9 volt signal corresponds to the maximum motor speed and the polarity of the voltage indicates the need for clockwise or counter clockwise rotation of the motor shaft.

A transfer line controller 66 issues advance and return slide signals on lines 67, 68 respectively. The microprocessor 44 provides five status signals to the transfer line controller 66 on line 70: slide advancing, full depth, slide returning, reference position proximity switch energized, and system inoperative.

Control of the microprocessor operation by computer programs stored in read only memory (ROM) is illustrated with the aid of FIG. 4. A cycle monitor 72 interprets the state of the externally developed input signals and the internal flags of the computer program to direct flow to the advance or retract subroutines 74, 75, respectively. Once the system is initialized upon actuation of the reference position proximity switch, the program flow always returns through the cycle monitor 72 unless a system fault is detected, in which case shut down is executed. The loop through the monitor is repeated as long as the system is operative. The cycle monitor is responsible for the selection of the appropriate directional processing routine but does not participate directly in the control algorithms. Cycle control is exercised by stepping through the look-up table of paired slide velocity-slide position values stored in EPROM. The data table is divided into six byte units called task control blocks (TCB) 76. Two types of TCBs control the choice between constant velocity segments and variable velocity segments of the slide motion cycle shown in FIG. 2.

The slide cycle begins when the various count registers and software instructions are initialized following determination of the referenced position. When this occurs, the first TCB is called from memory and is used to control slide velocity over that portion of the slide path to which the first TCB is dedicated. Referring to FIG. 2, ramp 24 indicates a rapid acceleration to the maximum motor speed. The signal that produces this result is +9 volts transmitted on line 63 to the motor servo control 54. An output signal from the servo control is transmitted to the motor 12 on line 78; this signal energizes the motor windings to produce the maximum speed. Successive TCB's are called from memory to control slide operation during decelerations 26, constant slide velocity at the feed rate 27 and during the dwell period 28. When the final TCB is completed, the stored value of the target slide position is compared to the final position recorded during the forward movements and final corrections are made if required. The position of the slide is held momentarily and a full depth signal is issued to the transfer line controller until the advance signal on line 67 is removed and the retract signal issues. The microprocessor uses the position information compiled during forward movement of the slide to calculate a set of temporary TCB entries of velocity and position that control execution of the return movement of the slide to the reference position.

Acceleration and deceleration of the slide are directed from different task control blocks whose incremental positions and corresponding velocities are spaced differently to provide the fastest possible overall cycle. Acceleration is programmed simply as a full velocity command allowing the motor and slide to accelerate to full speed at the maximum possible rate. Deceleration segments of the slide cycle, however, must control the arrival of a slide at a precise target position. Accordingly, the slide velocity-position combinations are stored in the table in paired sets corresponding to increments of the length of the deceleration ramp. Of course, the stored tables can be supplied with different deceleration profiles recalled from memory as required when the slide is, for example, operated to perform different machining functions. The acceleration ramp 24 could also be controlled by a table of stored velocity-position profiles where this is required.

Two options are available in the storage and processing of the slide motion cycle in memory. For example, the velocity-position pairs corresponding to the transition points of the slide cycle where the rate of change of velocity with respect to position changes rapidly may be coded into the look-up tables that control the slide motion. In this case, when only the transition points have velocity-position pairs to define the slide cycle, the microprocessor computes new values of the pairs at incremental positions between the transition points in real time as required to update the velocity commands. This option allows minimal use of computer memory to define the cycle, however, the operating computer program and computer instructions that are stored in RAM are increased correspondingly.

A second option, one to which reference has been made in the system description, has each velocity position pair precomputed and stored in EPROM during operation. The microprocessor simply reads the values from these tables to update the velocity commands by way of the target count that is transmitted through line 64 to the comparator 58. Computational execution time and operating computer memory requirements are reduced when this option is chosen.

If the first option is elected, the position control system 45 interacts with microprocessor 44, which has access to an algorithm stored in read only memory. The algorithm partitions the velocity-position profile of FIG. 2 and calculates paired values of velocity and position that define the desired slide operation at an appropriate number of velocity increments. The position of the slide relative to the reference position associated with a velocity increment is stored in programmable read only memory.

In operation the comparator 58 sequentially receives the binary numbers representing the slide position that has accrued since the occurence of system initialization. The other input to the comparator 58 is the byte comprising the least significant bits of the target count representing the target position of the slide corresponding to the next velocity increment. When motion of the slide causes the binary counter to register a slide position equal to the target count position, the updated velocity value corresponding to the target position is transmitted on line 80 to the digital-to-analog converter 82. Successive target positions are recalled from memory or computed before they are required; consequently, few real time computational delays are incurred between the occurence of the comparator match and the execution of the velocity signal. This permits minimum response time. A coded velocity value transmitted to the D/A converter 82 is used to produce an analog voltage signal on line 63 that is transmitted to the motor servo-control.

The signal from the tachometer 48 is transmitted through line 84 to the motor servo-control 54. The servo-control compares the voltage signal from the D/A converter 82 with a velocity signal received from the tachometer. Servo-control 54 produces a control signal for the motor drive amplifiers that will minimize the difference between the velocity measured by the tachometer and the command velocity voltage signal transmitted on line 63.

Having described the preferred embodiment of our invention what we claim and desire to secure by U.S. Letters Patent is:

1. In a drive system wherein a variable speed electric motor produces cyclical movement of a slide along a path, a control system adapted for connection to the motor power supply comprising:

encoder means producing a constant number of electrical pulses during each revolution of the motor shaft;

means for determining a reference position for the slide and for initializing the control system;

a memory wherein predetermined paired values of slide velocity and position representing ideal such values for the slide at multiple incremental target positions along its path are stored;

data processing means comprising a binary counter for counting and registering encoder pulses following initialization, the count representing the actual position of the slide with respect to the reference position a microprocessor adapted to recall from said memory the slide velocity-position pair that corresponds to a slide target position and adapted to produce a digital signal representing the slide velocity corresponding to the slide target position; and a comparator receiving input signals representing a slide target position and the actual slide position, producing an output signal when said input signals are identical, whereby the signal representing the slide velocity corresponding to the slide target position is produced by the microprocessor if the output signal is received from said comparator; and means for converting the output signal of said processing means to an analog voltage whose magnitude determines the velocity of the slide and whose polarity determines the sense of direction of the slide.

2. In a drive system wherein a variable speed electric motor produces cyclical movement of a slide along a path, a control system adapted for connection to the motor power supply comprising:

encoder means producing a constant number of electrical pulses during each revolution of the motor shaft;

means for determining a reference position of the slide and for initializing the control system;

a memory wherein coded, predetermined paired values of slide velocity and position relative to the reference position are stored, the pairs defining the desired velocity and position of the slide at points along the slide path at which the rate of change of slide velocity with respect to slide position changes abruptly;

means for computing target slide velocity-position paired values, each pair corresponding to a slide position intermediate the slide position of the predetermined pairs;

data processing means comprising a binary counter for counting and registering encoder pulses following initialization, the count representing the actual position of the slide with respect to the reference position; a microprocessor adapted to produce a digital signal representing a computed slide velocity corresponding to a slide target position; and a comparator receiving input signals representing a slide target position and the actual slide position, producing an output signal when said input signals are identical, whereby the signal representing the computed slide velocity corresponding to the slide target position is produced by the microprocessor if the output signal is received from said comparator; and means for converting the output signals of said processing means to an analog voltage whose magnitude determines the velocity of the slide and whose polarity determines the sense of direction of the slide.

3. The control system according to claim 1 or 2 further including encoder means producing a signal representing the absolute number of rotor shaft revolutions that occur following the initializing signal.

4. The control system according to claim 1 or 2 wherein said encoder means produces one marker pulse per motor shaft revolution and wherein said reference positioning means comprises:

a metallic vane mounted on the slide; and a circuit including a proximity switch adapted to close the circuit when the vane is moved by slide motion to the location of the switch, whereby a reference position for the slide is established at its position when a marker pulse first occurs following closure of the switch.

5. The control system according to claim 1 wherein said data processing means further comprises:

a digital-to-analog converter receiving the digital velocity signal corresponding to the slide target position from the microprocessor and converting the digital signal to an analog velocity signal;

a tachometer producing an output signal representing the actual motor shaft speed; and means for minimizing the difference between the velocity signal produced by the digital-to-analog converter and the velocity signal produced by the tachometer, whereby the motor speed and its direction of rotation are controlled in response to a signal that minimizes such difference.

6. The control system according to claim 2 wherein said data processing means further comprises:

a digital-to-analog converter receiving the digital velocity signal corresponding to the slide target position from the microprocessor and converting the digital signal to an analog velocity signal;

a tachometer producing an output signal representing the actual motor shaft speed; and means for minimizing the difference between the velocity signal produced by the digital-to-analog converter and the velocity signal produced by the tachometer, whereby the motor speed and its direction of rotation are controlled in response to a signal that minimizes such difference.

* * * * *